Dec. 1, 1959   E. L. BYRKETT   2,914,860
GAGING DEVICE
Filed Oct. 3, 1956
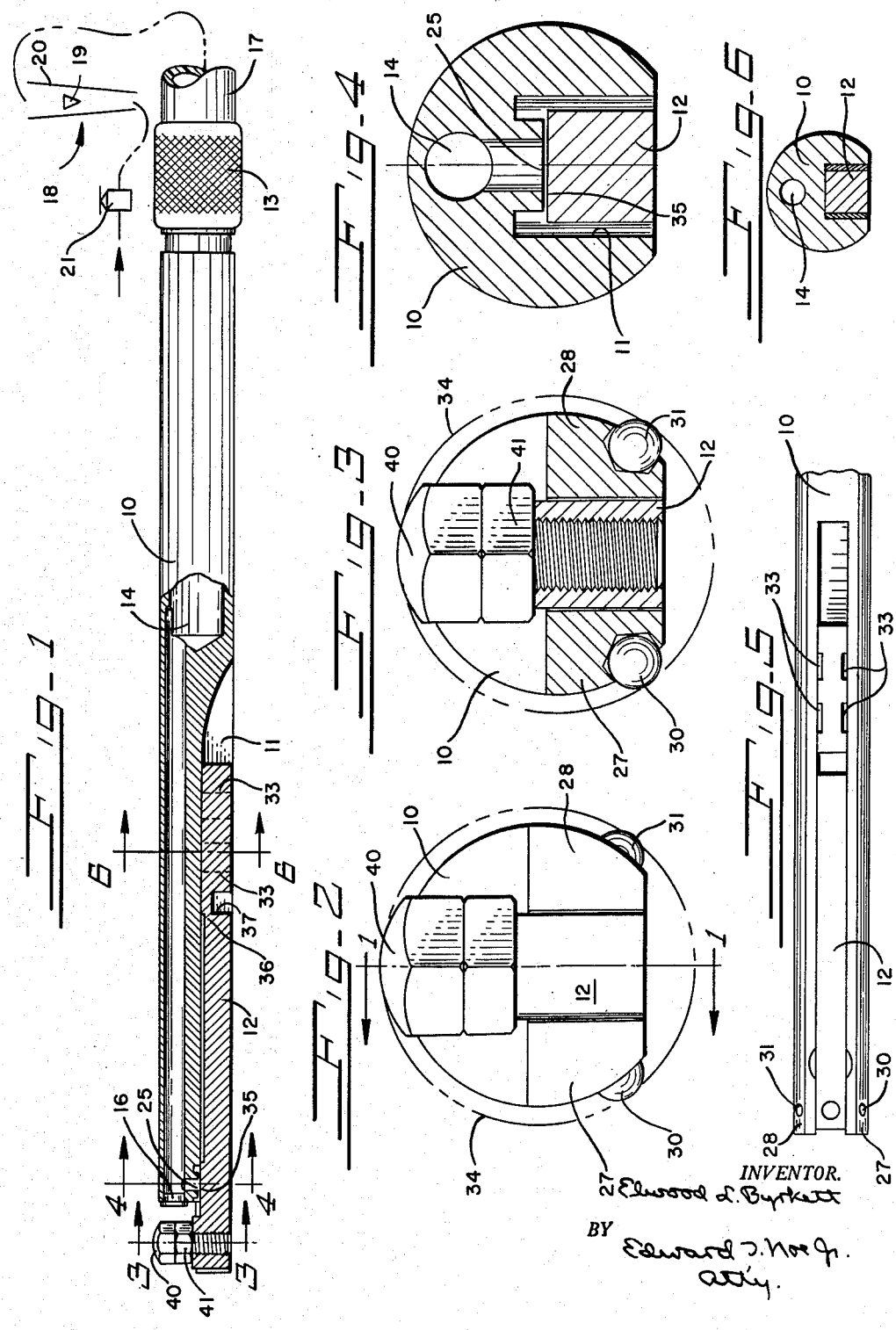
INVENTOR.
Elwood L. Byrkett
BY Edward J. Noe Jr.
atty.

United States Patent Office 2,914,860
Patented Dec. 1, 1959

2,914,860

GAGING DEVICE

Elwood L. Byrkett, Dayton, Ohio, assignor, by mesne assignments, to The Sheffield Corporation, a corporation of Delaware Application October 3, 1956, Serial No. 613,775

6 Claims. (Cl. 33—178)

This invention relates to gaging devices and more particularly to a spindle for gaging hole diameters.

It is an object of this invention to provide a gaging spindle for measuring hole diameters, the spindle being simple and economical in construction, and reliable for repeated accurate gaging operations over a long service life.

It is a further object to provide such a spindle for use in air gaging systems formed of only a minimum number of simple parts and especially adapted for use in measuring holes of small size.

It is a further object to provide a hole measuring spindle formed essentially of only two simple, integral members including a body providing a fluid leakage orifice for connection to a source of air under pressure and a gage and a flow controlling gaging arm pivotally connected to the body, the body and arm having contacts for engaging opposite sides of the hole wall.

It is a further object to provide such a spindle wherein the flow controlling arm and orifice relatively separate upon engagement of the contacts with the hole wall, whereby forceful engagement of the arm and orifice cannot occur during gaging and the critical gage components are protected from damage.

Further objects and advantages of the invention will be apparent from the following description, the appended claims, and the accompanying drawing, in which:

Figure 1 is a side view of an air leakage type dimension gaging spindle embodying the present invention shown in partial section taken on line 1—1 of Figure 2, Figure 2 illustrates the outer end of the spindle, Figures 3 and 4 are transverse sections taken respectively on lines 3—3 and 4—4 of Figure 1 on an enlarged scale, Figure 5 is a view of the outer lower portion of the spindle, and, Figure 6 is a transverse section on line 6—6 of Figure 1.

The gaging spindle of the present invention is of the fluid leakage type wherein the diameter of a hole being gaged controls the flow through a leakage orifice as indicated by an associated gaging instrument. The present spindle embodies essentially only two major integral components, an elongated body providing a leakage orifice and a flow controlling gaging arm swingably carried on the body, thus especially adapting the spindle for manufacture to small sizes for measuring small holes. Locating contacts on the body engage one side of the hole and a gaging contact on the arm engages the opposite side of the hole. The relative displacement of the locating and gaging contacts as determined by the diameter of the hole being gaged will control the clearance between a flow controlling portion of the arm and the leakage orifice and, accordingly, the resulting flow through the orifice to atmosphere will be responsive to the hole diameter.

Referring particularly to the drawing, Figure 1 illustrates the spindle assembly. Spindle body 10 is elongated and of generally cylindrical configuration. It has a groove 11 along its outer portion in which gaging member or arm 12 is carried. Passage means 14 extends along body 10 and is plugged at the outer end of the body by an insert 16. At the inner end of body 10 passage means 14 is coupled to a flexible tube 17 by a connection 13. Tube 17 leads to a flow measuring instrument 18, shown in this example as embodying a flow indicating float 19 movable along an internally tapered tube 20. Regulator 21 connected to instrument 18 is connected to a suitable source of air under pressure. The outer end of passage means 14 terminates in a gaging orifice 25 exhausting toward one side of the body at the bottom of groove 11.

Body 10 has a pair of relatively spaced axial extensions 27 and 28 at its forward or outer end extending beyond orifice 25 and forming continuations of the sides of groove 11 in this particular construction. Extensions 27 and 28 respectively carry locating contacts 30 and 31 for engagement with spaced chordal points on the wall of a hole 34, indicated in phantom in Figures 2 and 3. Contacts 30 and 31 thus locate body 10 and orifice 25 by engagement with one side of a hole and determine the direction of gaging in a diametral plane.

The inner end of arm 12 is fixed to body 10 within groove 11 as by cementing at points 33. Arm 12 has a flow controlling surface 35 opposing orifice 25 and carried for swinging movement relative thereto by a reduced resilient arm portion 36 formed by a transverse groove 37 which is beyond the fixedly supported portion of arm 12.

The outer portion of arm 12 extends beyond orifice 25 and between body extensions 27 and 28 in compact relationship therewith, as seen more particularly in Figures 2 and 3. A gaging contact 40 is carried at the outer end of arm 12 in a common plane with locating contacts 30 and 31 for engagement with the opposite side of the hole wall. Gaging contact 40, in this example, is formed at the outer end of a screw threaded into arm 12 as seen in Figure 3. Through rotation of contact 40, its disposition relative to locating contacts 30 and 31, can be adjusted to provide a range of possible gaging and for adjustment during set up. Lock nut 41 firmly secures contact 40 in place following adjustment.

During gaging the spindle is inserted in the hole to be measured and contacts 30, 31, and 40 are relatively urged into engagement with opposite sides of the hole wall through the resilience of the reduced section 36 of arm 12. Contacts 30 and 31 insure that gaging is in a diametral plane. By rocking the spindle about an axis determined by contacts 30 and 31 until the highest position of float 19 is obtained an accurate diameter check will be made. When the spindle is clear of a hole, surface 35 will be as close to orifice 25 as it ever approaches it. During gaging increased orifice clearances are obtained. If, for example, the spindle were forced into an undersized hole the critical flow controlling surface 35 and orifice 25 will not be forced against one another but will be moved away from each other and thus protected. Thus it is impossible to jam these critical gaging surfaces together during gaging.

Thus it is seen that a gaging spindle has been provided which is extremely simple in construction, making it possible to manufacture it to very small sizes without involving delicate and expensive components. The number of components involved is an absolute minimum and the gage is simple in application. Through the adjustability of the gaging contact a range of possible hole sizes can be measured while maintaining the clearances between the flow controlling surface and orifice within the desired range for accurate air gaging.

What is claimed is:

1. A gaging spindle for diametral hole measurements comprising an elongated body having a passage along a portion thereof adapted for connection at one end of the body to a source of air under pressure and an air gage and terminating adjacent the other end of the body in a fluid leakage orifice exhausting toward one side of the body, a pair of locating contacts spaced transversely adjacent the outer end of said body at one side thereof for engagement with spaced chordal points on the wall of a hole to be gaged, a gaging arm fixed at one end to said body and extending along the same side of the body as said locating contacts, said arm having a reduced resilient section forming a pivot support therefor, a gaging contact, adjustable means at one end of said arm extending diametrically across said body to the opposite side thereof and supporting said gaging contact for radial adjustment on the arm and engagement with the opposite side of the hole wall from the locating contacts in a common diametral plane therewith, and a flow controlling surface on said arm in opposition to said orifice.

2. A gaging spindle for diametral hole measurements comprising an elongated body having a passage therealong adapted for connection at one end of the body to a source of air under pressure and an air gage and terminating adjacent the other end of the body in a fluid leakage orifice, a pair of locating contacts fixed to said body adjacents its outer end and at one side thereof for engagement with spaced chordal points on the wall of a hole to be gaged, a gaging arm extending along said body at the same side as said locating contacts, means swingably connecting the arm to said body, the outer end of the gaging arm extending between said locating contacts, a gaging contact carried at the outer end of said arm and disposed at the opposite side of the body from the arm and said locating contacts for engagement with the opposite side of the hole wall from the locating contacts, and a flow controlling surface on said arm in opposition to said orifice.

3. A gaging spindle for diametral measurements of a hole in a part comprising an elongated body having a groove extending longitudinally therealong and a longitudinal passage adapted for connection at one end to a source of air under pressure and a gage, said passage terminating in a lateral discharge orifice in a wall of the body exhausting toward one side of the body at the bottom of said groove adjacent the other end thereof, an orifice controlling member extending along said groove, means mounting said member on said body at a point remote from said orifice for swinging movement toward and from the orifice to control flow therethrough, said body having means for contacting the side of a hole in a part to be measured adjacent the member and engaging means on said member for contacting the opposite side of the hole.

4. A gaging spindle for diametral hole measurements comprising an elongated body having an air inlet connection at its inner end for attachment to a source of air under pressure and an air gage, said body having a groove extending along the body at one side thereof and a passage therealong in communication with said inlet connection and terminating in a fluid leakage orifice exhausting toward one side of the body at the bottom of said groove adjacent the outer body end, said body having axial extensions forming spaced continuations at respective sides of said groove at its outer end, a pair of locating contacts, one on each of said extensions and at the same side of the body as said groove for engagement with spaced chordal points on the wall of a hole to be gaged, a gaging arm disposed in said groove and extending therealong, means pivotally supporting said arm on said body, a gaging contact, and means at the outer end of said arm extending diametrically across the body between said body extensions carrying said gaging contact for engagement with the opposite side of the hole wall from the locating contacts, said arm having a flow controlling surface in opposiltion to said leakage orifice.

5. A gaging spindle as set forth in claim 4 wherein the inner end of said arm is fixed to said body, said arm having a reduced resilient section providing the pivot support therefor.

6. A gaging spindle as set forth in claim 4 wherein said gaging contact includes adjustable means for varying its extent, whereby the spindle is adjustable for a wide range of hole sizes.

References Cited in the file of this patent

UNITED STATES PATENTS

| | | |
|---|---|---|
| 2,590,151 | Bryant et al. | Mar. 25, 1952 |
| 2,712,181 | Mahlmeister | July 5, 1955 |

FOREIGN PATENTS

| | | |
|---|---|---|
| 873,748 | Germany | Apr. 16, 1953 |